Figure 1:
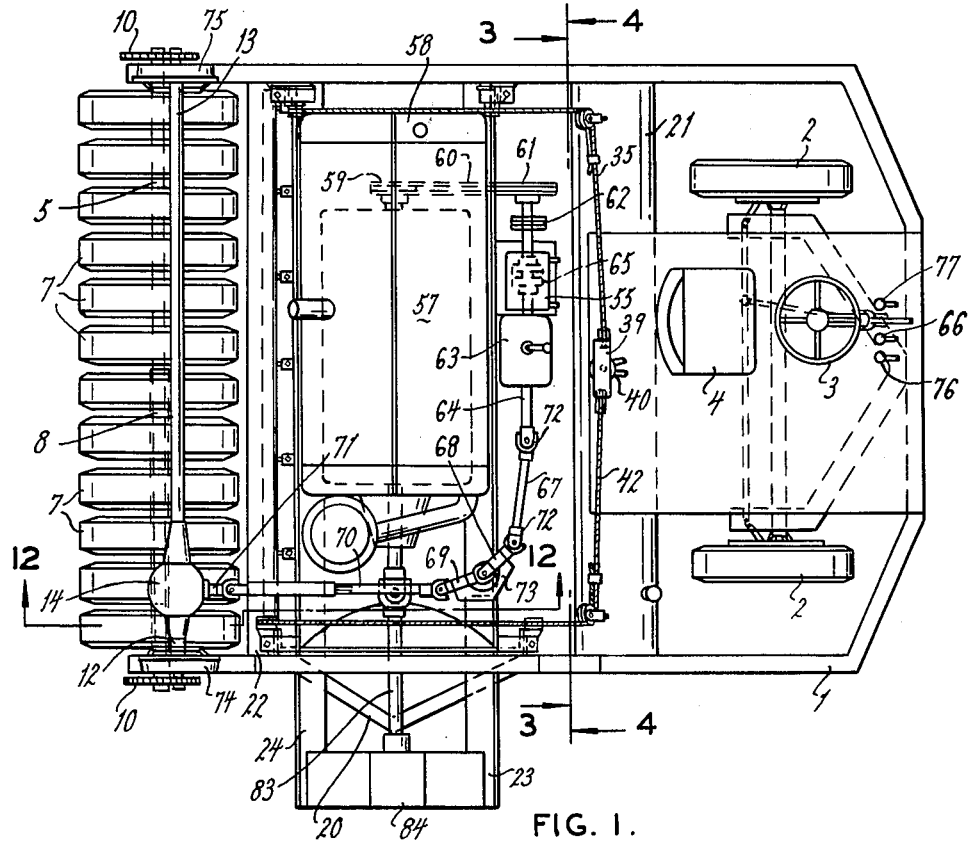

March 27, 1956 J. T. ROBERTS 2,739,517
ROTARY PLOW
Filed May 26, 1950 4 Sheets-Sheet 1

INVENTOR.
JOHN T. ROBERTS
BY John H. Cassidy
ATTORNEY

March 27, 1956   J. T. ROBERTS   2,739,517
ROTARY PLOW
Filed May 26, 1950   4 Sheets-Sheet 2

INVENTOR.
JOHN T. ROBERTS
BY
ATTORNEY

March 27, 1956   J. T. ROBERTS   2,739,517
ROTARY PLOW

Filed May 26, 1950   4 Sheets-Sheet 3

INVENTOR.
JOHN T. ROBERTS
BY *John H. Cassidy*
ATTORNEY

March 27, 1956   J. T. ROBERTS   2,739,517
ROTARY PLOW
Filed May 26, 1950   4 Sheets-Sheet 4

INVENTOR.
JOHN T. ROBERTS
BY
ATTORNEY

# United States Patent Office 2,739,517
Patented Mar. 27, 1956

2,739,517

ROTARY PLOW

John T. Roberts, St. Louis, Mo.; Eva E. Roberts, administratrix of said John T. Roberts, deceased, assignor of one-half to Eva E. Roberts, St. Charles County, and one-half to Ida C. Matlock, Cabool, Mo.

Application May 26, 1950, Serial No. 164,533

3 Claims. (Cl. 97—40)

This invention pertains to rotary plows of the power driven type.

While the invention is defined in the appended claims, and various aspects of the invention are capable of use separate and apart from other aspects, a summary description of the invention will assist in understanding the invention and the later detailed description of a preferred embodiment of the invention.

The plow includes a vehicular frame, upon which is mounted a sub-frame for up and down movement thereon. The sub-frame carries a horizontal rotor constructed and adapted to break the soil and a motor connected to drive the rotor. A hydraulic lift operable by a pump, preferably driven by the motor, may be provided to raise and lower the sub-frame on the vehicular frame.

The motor is mounted on the sub-frame above the rotor with the axis of its crank shaft approximately parallel to the axis of the rotor. A propeller shaft is extended from and driven by the crank shaft, and a driving shaft extends upwardly and outwardly from the axis of the rotor; the propeller shaft and driving shaft having interengaging spur gears on their extended ends.

Shares are arranged radially along the rotor and may also be arranged radially about the upwardly inclined driving shaft, with a universal joint connecting the rotor proper and the driving shaft.

The plow may be automotive and driven by a pair of traction rollers arranged end to end rearward of the rotor, thus acting as propelling means as well as to roll the earth after it has been pulverized by the rotor. The rollers may be driven separately from the motor, through a differential and may be controlled by separate brakes.

The shares on the rotor are V-shaped and so arranged that the leading point generates a circle which entirely surrounds and clears all other portions of the share. A blade is arranged radially in front of the share and has its outer point extending beyond the leading point of the share.

A deflecting apron is mounted on the sub-frame to the rear of the rotor to deflect soil thereon rearward by the rotor. It is connected to the sub-frame preferably by a flexible web and its lower edge is yieldingly held downward by pressure devices in such a manner that it will evenly deflect and spread the soil thrown against it.

A preferred embodiment of this invention is illustrated in the accompanying drawings, in which—

Figure 2:
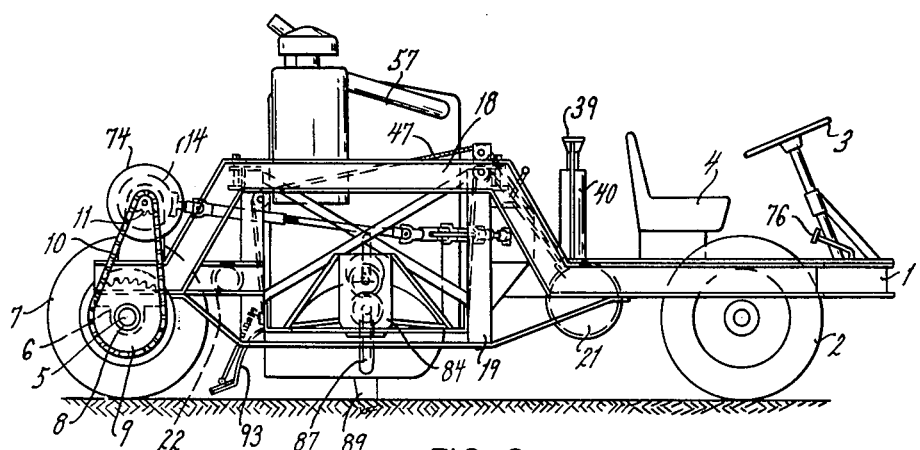
Figure 3:
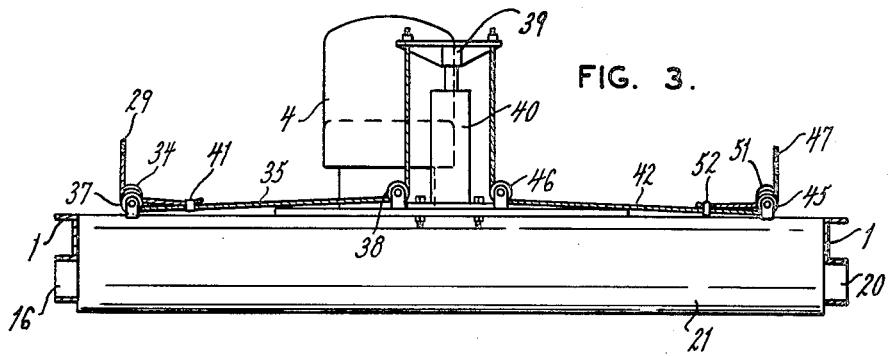
Figures 4, 6:
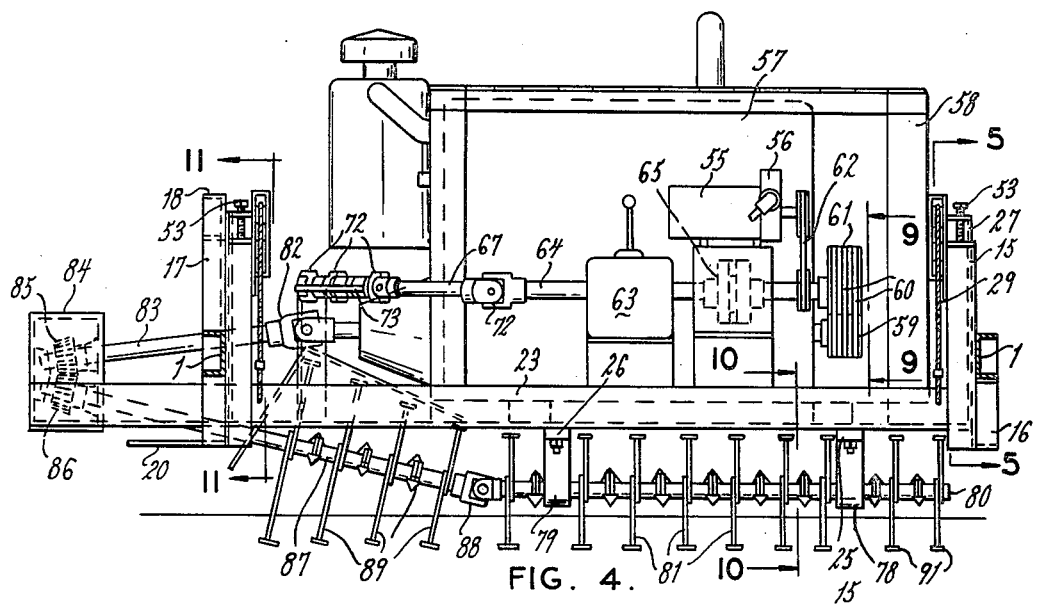
Figure 5:
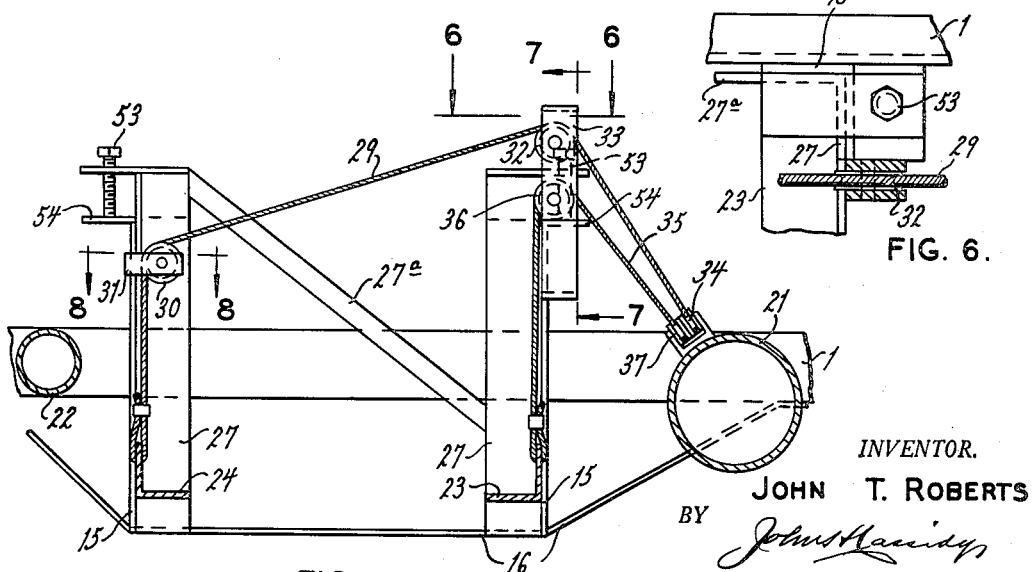
Figure 7:
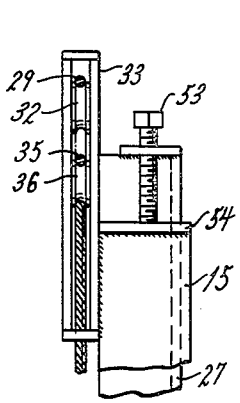
Figure 8:
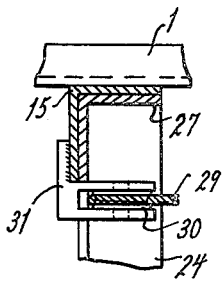
Figure 9:
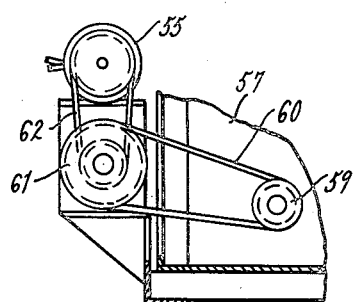
Figure 10:
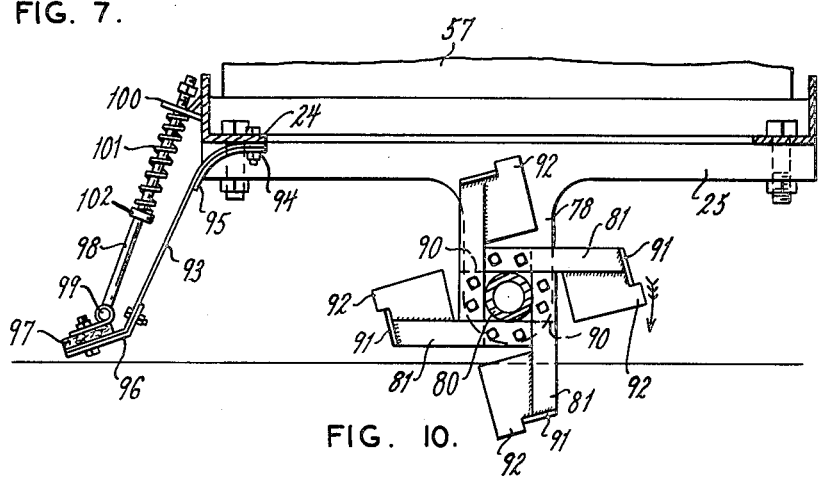
Figure 11:
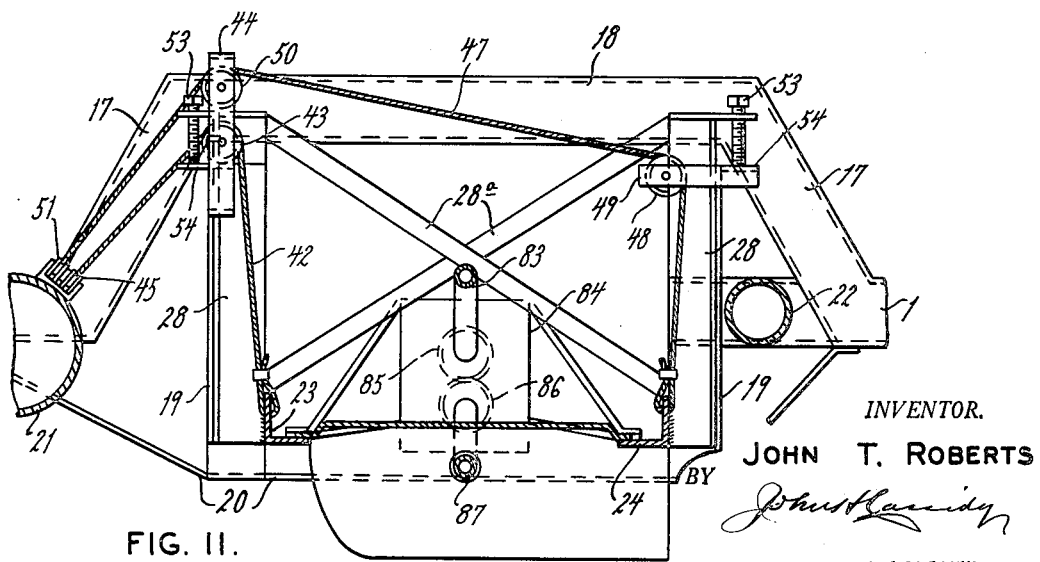
Figure 12:
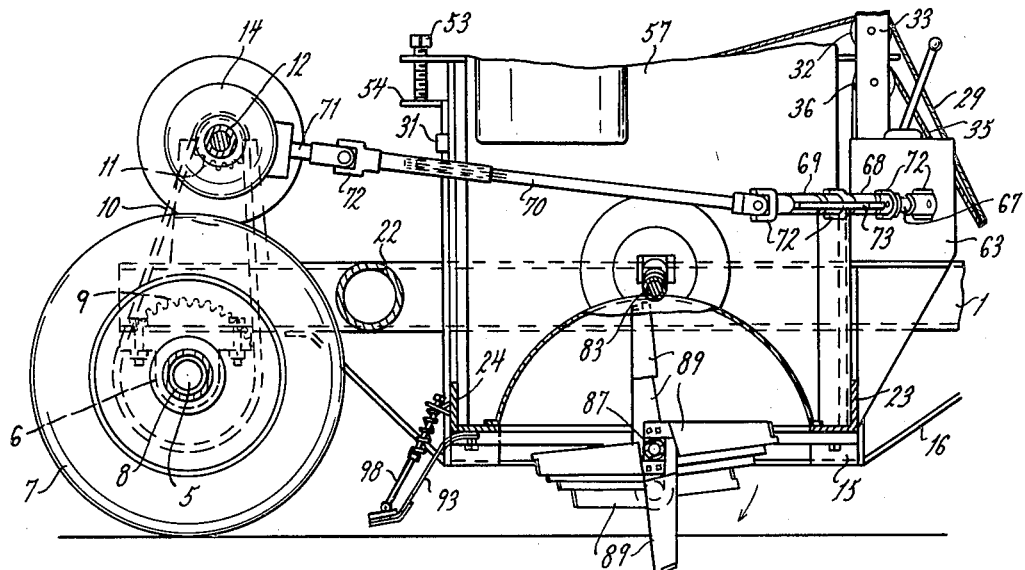
Figure 13:
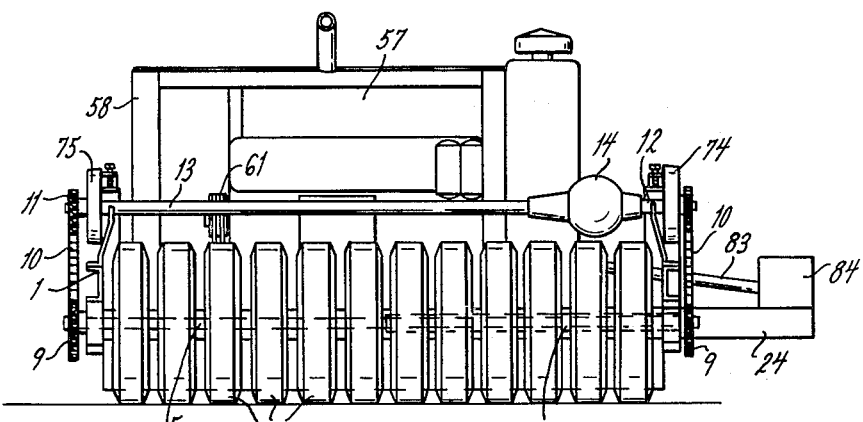
Figure 14:
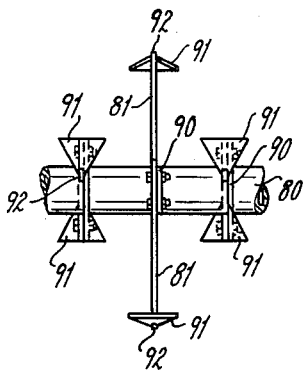

Fig. 1 is a plan view of a rotary plow embodying this invention;
Fig. 2 is a side elevation of Fig. 1;
Fig. 3 is a detail section on line 3—3 of Fig. 1;
Fig. 4 is a section on line 4—4 of Fig. 1;
Fig. 5 is a detail section on line 5—5 of Fig. 4;
Fig. 6 is an enlarged detail section on line 6—6 of Fig. 5;
Fig. 7 is a similar section on line 7—7 of Fig. 5;
Fig. 8 is a similar section on line 8—8 of Fig. 5;
Fig. 9 is a detail section on line 9—9 of Fig. 4;
Fig. 10 is a similar section on line 10—10 of Fig. 4;
Fig. 11 is a section on line 11—11 of Fig. 4;
Fig. 12 is a section on line 12—12 of Fig. 1;
Fig. 13 is a rear view of the machine (from the left of Fig. 2); and
Fig. 14 is a detail of the plow shares.

Referring to the drawings, 1 designates a vehicle frame or chassis mounted at its forward part on steerable road wheels 2 controlled by a steering wheel 3 from a driver's seat 4. The rear of the chassis is spanned by an axle shaft 5 journalled in bearings 6 on the chassis and carrying a series of tired wheels 7, thus forming a vehicle adapted to travel on the wheels 2 and 7. The wheels 7 are arranged closely adjacent to each other so as to form a substantially continuous roller. They are equipped with tires, preferably of the ordinary pneumatic type used on automobiles. Thus, these wheels form, in effect, a substantially continuous, grooved roller, the grooves being formed by the spaces between the treads of the tires. However, the wheels are divided into two groups forming separate rollers which are separately driven, one half (the upper half in Fig. 1) being fixed to the shaft 5 and the other to a sleeve 8 surrounding the shaft 5. This sleeve and the shaft 5 have fixed thereto, at their outer ends, sprockets 9 connected by chains 10 to sprockets 11 on shafts housed in tubes 12 and 13 and driven by the engine through a differential within the housing 14 as will be more fully described hereinafter.

On the left side of the vehicle a pair of upright angle bars 15 is welded or otherwise secured to the chassis 1 and braced by a lower brace 16, also secured to the chassis. (See Fig. 5.) On the right side of the vehicle the side bar of the chassis is deflected upward as shown in Fig. 11 to form a sort of bridge comprising angular end struts 17 and a horizontal top girder 18. This structure has secured thereto a pair of upright angle bars 19, similar to the bars 15 and similarly braced by a brace 20. The chassis 1 is braced laterally by tubular cross members 21 and 22, the former being enlarged and sealed at its ends to form a fuel tank.

The upright angle bars 15 and 19 are arranged to form guides or ways for a vertically movable subframe or cradle comprising front and rear, laterally extending angle bars 23 and 24 respectively, cross members 25 and 26 (Fig. 4) and vertically extending angle bars 27 braced by an angle brace 27a (Fig. 5) and similar angle bars 28 braced by cross braces 28a (Fig. 11). The bars 27 and 28 are arranged to slide vertically in the ways 15 and 19 respectively to guide the vertical travel of the cradle. Means for moving the cradle up and down comprises a series of hoisting cables. Of these, a cable 29 is secured to the bar 24 as shown in Fig. 5 and passes up over a pulley 30 on a bracket 31 on the rear upright 15, then over a pulley 32 on a bracket 33 on the front upright 15, then over a pulley 34 on the chassis. A second cable 35 is secured to the bar 23 as shown in Fig. 5 and passes over a pulley 36 on the bracket 33, then successively over pulleys 37 and 38 and is secured to the head 39 of a hydraulic hoist 40 mounted on the forward part of the chassis. The cable 29 is secured at 41 (Fig. 3) to the cable 35 so that the hoist 40 pulls both these cables simultaneously.

Similar hoisting connections are provided for the right hand end of the cradle as shown in Fig. 11. A cable 42 is attached to the bar 23 as shown in this figure and passes over a pulley 43 on a bracket 44 secured to the upright way 19, then successively over pulleys 45 and 46 on the chassis and its other end attached to the head 39 of the hoist. Another cable 47 is attached to the bar 24 and passes over a pulley 48 on a bracket 49 on the upright 19, then over a pulley 50 on the bracket 44 and a pulley 51 on the chassis and is secured to the cable 42 at 52. Stop screws 53 on the upright members 27 and 28 of the cradle are arranged to engage ledges 54 on the ways 15 and 19 to support the weight of the cradle at its finally adjusted height. The hoist 40 is connected by suitable connections, not shown, with a pump 55 supplying hydraulic fluid for operating the hoist. A valve arrangement 56 may be operated to supply fluid to the hoist or shut off this supply and hold the fluid in the hoist while short-circuiting the pump.

An engine or motor 57 is mounted on the cradle in any suitable manner in the position shown in the drawings. In the illustrated embodiment, an engine of the internal combustion type is shown having a radiator 58. In this embodiment both ends of the engine crank shaft are accessible for power take-off. The left end of this shaft has mounted thereon a multiple-belt pulley 59 connected by belts 60 to drive a countershaft 61. This countershaft is connected by a belt drive 62 (Fig. 9) to drive the pump 55. The countershaft 61 is connected through a speed-changing gear box 63 to a drive shaft 64 for driving the wheels 7. A friction clutch, indicated conventionally at 65 may be interposed in these connections and operated by suitable control connections, not shown, by a clutch pedal 66 at the driver's seat. The clutch 65 may be enclosed in a housing on which the pump 55 may be mounted as shown in Fig. 4. The shaft 64 is connected by a flexible shaft comprising sections 67, 68, 69, 70 and 71, connected serially by universal joints 72, with the differential 14. Certain intermediate sections, such as the sections 68 and 69, may be supported by bearings 73 on the cradle, in order to steady the operation of the drive. This flexible-shaft connection serves, therefore, to drive the two groups of wheels 7 through the differential 14, the shafts 12 and 13, and the chains 10. Brakes 74 and 75, on the shafts 12 and 13, may be operated by connections, not shown, from brake pedals 76 and 77 at the driver's seat. This provides for independent control of each roller or group of wheels 7 to assist in steering the vehicle over rough ground.

Mounted below the cradle, in bearings 78 and 79 on the cross members 25 and 26 respectively, is a rotor comprising a plow shaft 80 carrying a series of plows or shares 81. The righthand end of the engine crankshaft is connected by a universal joint 82 to an angularly disposed propeller shaft 83 whose other end is journalled in a bearing housing 84 on the end of the cradle. The shaft 83 carries a bevel gear 85 meshing with a similar gear 86 on a second angularly disposed drive shaft 87 whose other end is connected by a universal joint 88 to the plow shaft 80. The shaft 87 may also be equipped with plows 89 whose radii vary with their position on said shaft in such a way that the lowest points of their travel will be on the same level with the lowest points of travel of the plows 81 on the shaft 80, as shown in Fig. 9, thus forming a second rotor adapted to break the soil. This arrangement of the shafts 83 and 87, involving two angular steps downward, provides a convenient and powerful drive for the plow shaft 80, which is located below and parallel to the engine crankshaft. The housing 84 protects the gears 85 and 86 from the dust raised by the plowing operation, and may be packed with lubricant to insure long life for these gears.

The structure of the plows 81 is shown in Figs. 10 and 14. A series of steel plates 90 may be secured to the plow shaft 80 by welding or otherwise at intervals therealong. The arms or blades 81 of the plows are then bolted to each plate in pairs extending in opposite directions from the shaft 80. Alternate pairs along the shaft extend at right angles to each other as shown in Figs. 10 and 14. Each blade 81 is equipped at its end with a plow share 91 adapted to cut the soil. The shares 91 may be welded to the blades 81 so as to extend generally at right angles thereto, but may be V-shaped in cross section as shown in Fig. 14. The front edge of each blade 81 has a tip 92 extending radially outward beyond the share 91 and sharpened so as to slit the soil in advance of the share, thereby rendering it easier for the latter to cut and turn the soil, and reducing the power required to drive the plow shaft. The share is positioned on the arm 81 so as to lie close to, but wholly within the circle generated by the leading tip of the share as it rotates on the shaft 80. In this position the share exerts no downward pressure on the ground, but simply cuts and lifts the top soil.

Mounted on the cradle between the rotor and the rear wheels 7 is an apron or drag comprising a flexible web 93 of canvas or the like, secured at 94 to the rear angle 24 of the cradle at intervals therealong. An arcuate metallic plate 95 may be mounted along its upper edge to hold it clear of the rotor. The lower edge of the web 93 is shod with a bent metallic plate 96 backed up by a board 97. A pressure rod 98 is hinged at 99 to the board 97 and extends upward through a hole in a guide bracket 100 on the angle 24. A coil spring 101 surrounds the rod 98, bearing at its lower end on a collar 102 secured to the rod 98 and at its upper end against the bracket 100. A number of these pressure-rod assemblies may be mounted at intervals along the apron. This apron intercepts the broken soil thrown up by the rotor and prevents any tendency for it to stack up in hills. The apron acts as an interceptor by its own weight and the pressure of the springs 101, whereby the dirt thrown against it is evenly and automatically spread upon the ground.

In the operation of this plow it is propelled over the ground by the pair of rollers formed by the two groups of wheels 7, which rollers can be controlled independently by means of the brakes 74 and 75 to assist in steering. The sub-frame carrying the rotor and the engine is adjusted to the desired height with the air of the hoist 40 and its position is then fixed by adjusting the stop screws 53. Now, as the vehicle is propelled over the ground the rotor is driven by the engine to rotate in the direction indicated by the arrows in Figs. 10 and 12. During such rotation the tips 92 of the rotor blades slit the soil vertically and the shares 91 cut the soil horizontally on both sides of the slit and turn the soil over. Thereafter the rollers 7 pass over the plowed soil to compact it and improve its condition for seeding.

Various changes may be made in the details of construction, within the scope of the appended claims, without departing from the spirit of this invention. Parts of the invention may be used without the whole and improvements may be added while retaining the benefits of the invention.

I claim:

1. A plow comprising a vehicle frame, wheels supporting said frame at a constant level, vertical guide means fixed to said vehicle frame, a sub-frame mounted in said guide means for vertical motion with respect thereto, a horizontally extending rotor adapted to break soil mounted on said sub-frame for rotation about a horizontal axis, a motor mounted on said sub-frame and connected to drive said rotor, a hydraulic pump operable by said motor, a single hydraulic lift operable by the pump, means including a plurality of flexible cables connecting said lift to said sub-frame and said vehicle frame so that said sub-frame may be moved upwardly relative to said vehicle frame by said lift and so that said sub-frame may rise automatically when said rotor strikes an obstacle, and vertically adjustable stop screws carried by said sub-frame for bearing at their lower ends against said vehicle frame to support the weight of said sub-frame at its finally adjusted height.

2. An agricultural implement comprising a vehicle frame, a sub-frame carried by said vehicle frame for vertical movement with respect thereto, a horizontally extending rotor mounted on said sub-frame for breaking and pulverizing the soil, a motor mounted on said sub-frame and connected to drive said rotor, a series of pneumatic tires on said vehicle frame spaced apart a short distance along a common horizontal axis behind said rotor to roll the earth after it has been pulverized, said series having a horizontal extent at least as great as that of said rotor and comprising two groups of pneumatic tires arranged end to end, and drive means including a differential transmitting motion from said motor to each of said groups of pneumatic tires.

3. A plow comprising a vehicle frame, wheels supporting said frame at a constant level, a sub-frame mounted on said vehicle frame for relative up and down movement thereon, a rotor constructed and adapted to break soil, said rotor being mounted on said sub-frame for rotation about a substantially horizontal axis, a motor mounted on said sub-frame and having a horizontally extending power take-off shaft, an inclined propeller shaft, a universal joint connecting said propeller shaft to said power take-off shaft, an inclined driving shaft in the same vertical plane as said propeller shaft, a universal joint connecting said driving shaft to said rotor, a single pair of interengaging gears connecting said propeller shaft and said driving shaft, a hydraulic pump operable by said motor, a single hydraulic lift operable by the pump, means including a plurality of flexible cables connecting said lift to said sub-frame and said vehicle frame so that said sub-frame may be moved upwardly relative to said vehicle frame by said lift and so that said sub-frame may rise automatically when said rotor strikes an obstacle, and vertically adjustable stop screws carried by said sub-frame for bearing at their lower ends against said vehicle frame to support the weight of said sub-frame at its finally adjusted height.

References Cited in the file of this patent
UNITED STATES PATENTS

| Number | Name | Date |
|---|---|---|
| 982,480 | Dawson | Jan. 24, 1911 |
| 1,040,990 | Avary | Oct. 15, 1912 |
| 1,137,031 | Stelzmann | Apr. 27, 1915 |
| 1,170,394 | Beamish | Feb. 1, 1916 |
| 1,203,091 | Autry | Oct. 31, 1916 |
| 1,475,455 | Skinner et al. | Nov. 27, 1923 |
| 1,806,054 | Gardner | May 19, 1931 |
| 1,819,544 | Dech | Aug. 18, 1931 |
| 1,878,442 | Hamshaw | Sept. 20, 1932 |
| 1,889,016 | Dinsmore | Nov. 29, 1932 |
| 2,110,790 | Daugherty et al. | Mar. 8, 1938 |
| 2,123,975 | Thiemann | July 19, 1938 |
| 2,164,845 | Steed et al. | July 4, 1939 |
| 2,168,733 | Dufour | Aug. 8, 1939 |
| 2,176,261 | Kelsey | Oct. 17, 1939 |
| 2,199,649 | Poulter | May 7, 1940 |
| 2,347,017 | Ariens | Apr. 18, 1944 |
| 2,361,798 | Smith | Oct. 31, 1944 |
| 2,388,553 | Kraus | Nov. 6, 1945 |
| 2,401,796 | Raitch | June 11, 1946 |
| 2,402,009 | Ariens | June 11, 1946 |
| 2,410,273 | Deubner | Oct. 29, 1946 |
| 2,443,147 | Ritchie | June 8, 1948 |
| 2,490,688 | Hill | Dec. 6, 1949 |
| 2,528,270 | Fundingsland | Oct. 31, 1950 |
| 2,554,030 | Holmes | May 22, 1951 |